United States Patent [19]

Stone

[11] 4,238,445

[45] Dec. 9, 1980

[54] PROCESS FOR MANUFACTURING GYPSUM BOARD

[75] Inventor: Richard F. Stone, Buffalo Grove, Ill.

[73] Assignee: United States Gypsum Company, Chicago, Ill.

[21] Appl. No.: 54,069

[22] Filed: Jul. 2, 1979

[51] Int. Cl.³ .................. B32B 13/00; B28B 3/00
[52] U.S. Cl. .................... 264/234; 156/39; 264/333; 264/345
[58] Field of Search ............. 264/234, 333, 86, 345, 264/346; 156/39, 43, 45, 346; 366/249, 263, 155, 238, 177, 180, 181, 153, 160, 161, 162; 416/40, 52

[56] References Cited

U.S. PATENT DOCUMENTS

| | | | |
|---|---|---|---|
| 4,057,443 | 11/1977 | Stiling et al. | 156/43 |
| 4,117,070 | 9/1978 | O'Neill | 264/234 |
| 4,148,781 | 4/1979 | Takeuchi et al. | 156/39 |
| 4,169,747 | 10/1979 | Derooy et al. | 156/39 |

*Primary Examiner*—Donald J. Arnold
*Attorney, Agent, or Firm*—Kenneth E. Roberts; Robert H. Robinson; Samuel Kurlandsky

[57] ABSTRACT

A process and apparatus for producing a healed stucco having lowered water demand without loss of normal strength development potential which comprises, while blending a small amount of water with the calcined gypsum, simultaneously or substantially simultaneously grinding the calcined gypsum so as to increase the surface area of the calcined gypsum particles while incorporating about 1–10% by weight of the calcined gypsum of free water.

6 Claims, 3 Drawing Figures

U.S. Patent  Dec. 9, 1980  4,238,445
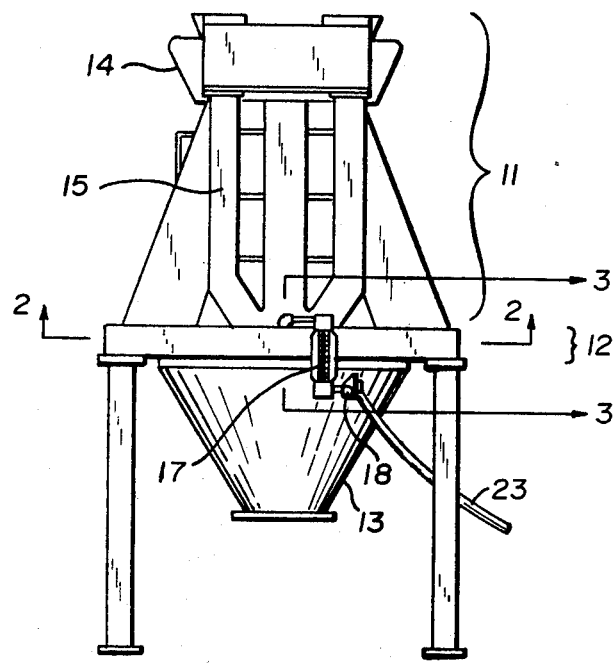
Fig. 1
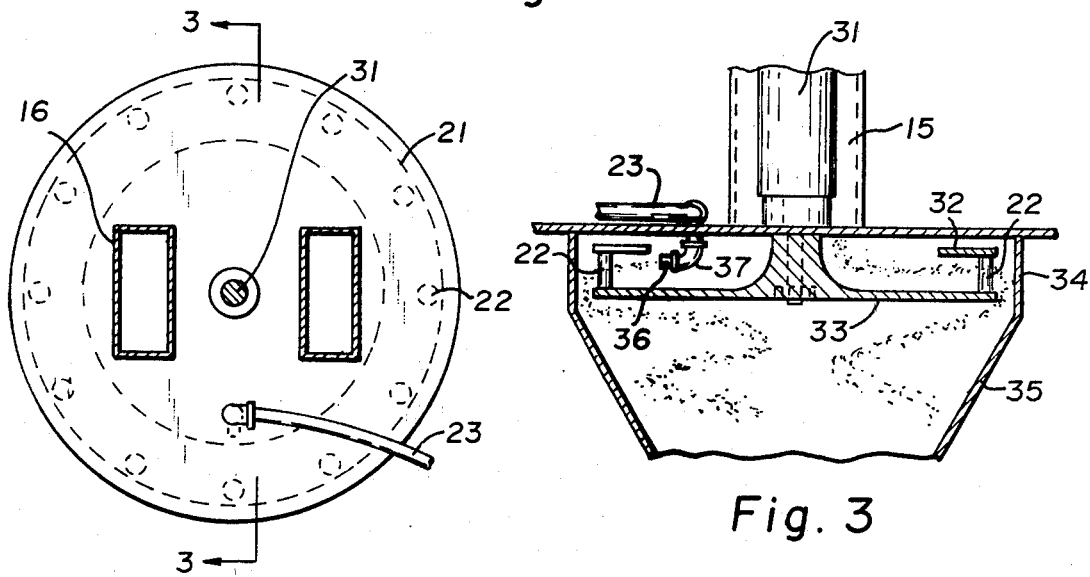
Fig. 2
Fig. 3

PROCESS FOR MANUFACTURING GYPSUM BOARD

BACKGROUND OF THE INVENTION

1. Field of the Invention

This invention relates to apparatus and process for preparing calcined gypsum whose properties in general, e.g., set time, dispersed consistency, rate of strength development, and other properties are particularly adapted for use in forming a cast gypsum article, such as for use in gypsum board manufacture and in making dried bagged industrial plasters for subsequent casting usage.

In automated gypsum board manufacture using continuously calcined gypsum stucco, a large portion of the processing time and energy is devoted to removing excess water from the wet board which was required to fluidize the calcined gypsum in water and obtain proper flow of the gypsum slurry. Thus calcined gypsum made by continuous calcination may have a dispersed consistency of about 100-200 cc., for a water usage of 85-100 parts of water per 100 parts of the calcined gypsum. For purposes of the present invention, "dispersed consistency" may be defined as the water volume required to give a standard viscosity or flow when a standard amount by weight of stucco is dispersed by mechanical mixing in a laboratory mixer at high shear intensity and for a standard time to equal mixing encountered in the gypsum board forming line, e.g., 7 seconds, or an industrial plaster casting mixer, e.g., 60 seconds. While the dispersed consistency may thereby be expressed in a particular number, such number is variable from one processing line to the next depending on the particular stucco and the amount of flow for that stucco being most desirable for the particular processing line; and the value of this number resides in the relative improvement for that line and in the time of temperature rise set for the same gypsum source. "Temperature rise set" and "set suddenness" for purposes of the present invention may be defined, respectively, as the particular time in which a particular calcined gypsum completes the exothermic reaction characteristic of hydration of stucco to gypsum; and as that portion of the exothermic stucco set time curve which exhibits the maximum rate of temperature rise. While defined times and temperatures may be given, it will also be appreciated here that they are meaningless from one gypsum source to another or from one gypsum board production plant to another; and only the relative change in the time and the set time curve for a particular gypsum source are of value.

2 Description of the Prior Art

In U.S. Pat. No. 4,117,070 there is described apparatus and processes for continuously treating calcined gypsum so as to lower the water demand and provide a treated gypsum mass which may be continuously fed into the slurry mixer of an automated gypsum board line. The treatment comprises thoroughly blending small amounts of water into the dry stucco, resulting in a damp but dry appearing material and allowing it to "heal" before usage in gypsum board manufacture. That is in allowing the small amounts of free water to remain on the particle surface for 1-10 minutes while fractures on the particle fuse so as to resist subsequent disintegration into micron sized fractions on mixing with water for hydration. Material so produced is particularly suitable for immediate utilization in gypsum board manufacture; however, if such material is not used right away, the set suddenness of the material begins to vary erratically. Further, it has been found that board manufactured by such processes is considerably weaker than if untreated stucco were used in making the board. In a U.S. patent application by Eugene O'Neill entitled "Improved Process for Preparing Calcined Gypsum and Gypsum Board," Ser. No. 939,624 there is disclosed a process which is an improvement over said patent by grinding the water treated material so as to increase the surface area of the particles generally up to about 4 times in order to recapture physical and rheological properties lost by the water treatment. Such requires that the automated line from calcination of the gypsum rock source to the formation of the board be modified by the addition of at least two pieces of equipment, the water blender and the grinder; and the addition of at least two separate operational steps. That patent application teaches a "healing" time between those two operational steps. It would be desirable to accomplish the same results, but with less added equipment, less added processing time, and in a simplified procedure. For example, for a full size plant operation, the elimination of either one of the two added pieces of equipment required could save a capitalization expense of perhaps a quarter of a million dollars.

SUMMARY OF THE INVENTION

Laboratory scale pilot plant and plant full size trials indicate that the rapid water treatment concurrently with grinding to increase the surface area of the particles and redevelop stucco activity can be accomplished in one combined operation. The process involves the proper introduction of both water and stucco into an impact centrifugal mill. Quite surprisingly grinding contemporaneously with water treatment without allowing a time interval between these steps for the particles to heal did not prevent recapture of physical and rheological properties. Water location, water flow rate, mill speed or particle impact speed, properly controlled will completely water treat the calcined gypsum and develop the necessary activity of the treated material for wallboard or other cast gypsum manufacture.

Thus, a principal object and advantage of the present invention is the provision of a process for treating calcined gypsum so as to lower the water demand while maintaining the material's ability to produce acceptable ultimate strengths in cast products, such as gypsum board, by a rapid water blending treatment and a grinding treatment performed simultaneously. Another object is the provision for the simultaneous blending of a mass of calcined gypsum with metered portions of water accompanied by grinding of the treated stucco in a single aparatus.

In one embodiment of the present invention, it was found that the advantages of rapid water addition and the step of regrinding can be accomplished in one combined operation in the same apparatus by modifying a centrifugal impact mill to introduce both water and stucco onto the impacting area of the mill so as to blend and combine the water and the stucco as they move towards and past the impactor pins to accomplish final blending of the water and the stucco before, during and after size reduction of the stucco. The processed material thus achieves a simultaneous free water incorporation and size reduction in basically a grinding type of apparatus, is then discharged and ages on its way to

BRIEF DESCRIPTION OF THE DRAWINGS

FIG. 1 is an illustration of a typical centrifugal impacting mill of the impactor pin type modified in accordance with this invention. A mill of this type, such as the ENTOLETER horizontal rotor mill illustrated in FIG. 1, generally comprises a feed chamber (11), grinding chamber (12), and product discharge chute (13). In general operation, dry powdered material enters the apparatus through feed hopper (14) passing down feed chutes (15) of which two are illustrated in FIG. 1 to feed inlets (16) more clearly shown in FIG. 2 at the bottom of the feed chamber (11) area and the powdered material is dispersed onto the face of a spinning rotor (21) as more clearly shown in FIG. 3. The spinning rotor is mounted on a shaft (31) connected to a source of drive not shown. The rotor (21) operates within a grinding chamber housing (12) having a target area (34) and a conical discharge hopper (35) at variable speeds determined by the source of drive motor up to about 50,000 feet per minute. This standard mill is modified to have a water inlet line (23), or a plurality of water inlet lines to provide water to impinge upon the calcined gypsum after it has left the feed inlet (16) and before the material is struck by the impactor pins (22) on the rotor (21). As more fully illustrated in FIG. 3 of the drawing, a nozzle (36), to act as a water spray head, is attached to a 90° elbow (37), in turn connected to the water line (23). The water line is equipped with a flow meter (17) and flow regulator (18) and then connected to a source of water (not shown).

In operation, calcined gypsum fed through the feed chute inlets (16) moves by centrifugal force across the spinning rotor (21) and toward the impactor pins (22) located at the rotor periphery. The swirling mass of calcined gypsum moving across the rotor, between the top plate (32) and bottom plate (33) thereof, encounters the swirling spray of water from nozzle (36) which is moving by water pressure and centrifugal force towards the impactor pins (22). The impactor pins are moving at a high velocity and as the now water coated calcined gypsum particles are struck by the impactor pins there is a primary size reduction of the water coated calcined gypsum and a thorough intermingling of separate water droplet fragments and calcined gypsum fragments. Both of these materials, moving at the velocity imparted by the impactor pins (22) further blend together as they are hurled against a target area (34) on the grinding chamber housing, during which final blending and mixing of the water and calcined gypsum occurs along with final particle size reduction. The processed material, still undergoing blending, spirals to the bottom of the conical discharge hopper (35) and out to conveyors and/or storage bins (not shown).

The controllable rotor speed determines: (a) the impact action of the water and the calcined gypsum against the impactor pins (22) and sidewall of the housing (34); (b) the degree of thoroughness in blending water and calcined gypsum; and (c) degree of particle size reduction. The speed of rotor (21) can be closely regulated to provide precise results on size reduction and water blending. The degree of blending of water and calcined gypsum is also variable by the rate of their individual feeds and to a degree by the location of the water injection nozzles (36) and their discharge pattern.

It is important that the water not be injected too far back from the impactor pins in order to avoid building up a wetted coating of mixed water and stucco on the rotor or the sidewalls. As a practical matter there may be some build up on the face of the rotor close to the shaft caused by eddy currents in the flowing materials. For this reason it may be desired to mount the water injector nozzles (36) within the calcined gypsum feed chute inlet (16) or to have from 2 through 4, or more, separate water injection nozzles (36) each having very small orifices to shoot a number of narrow streams of water from close to the impactor pins. It is believed that using a fan type of nozzle shape or locating the water nozzle closer to the rotor shaft (31) would be detrimental as likely to cause more build up of water coated calcined gypsum. Some of that coated gypsum from a fan nozzle could thus ball up, agglomerate into sticky masses, overcome the centrifugal force and stick to the rotor (21).

In practice it has been found satisfactory to meter from about 0.31 to 0.51 tons per hour of water through a single nozzle as shown in FIG. 3 onto a rotor operating at about 4,500 rpm and having 12 pins located in a single row around the periphery of a 27 inch diameter rotor while feeding 12½ tons per hour of calcined gypsum to obtain treated gypsum containing the optimum about 2½ to 3½% free water and surface area increase of about 2 times. This has a through put rate of about 430 pounds per minute. Of course, higher feed rates of either the water or calcined gypsum or both can be provided by faster rotor speeds or using a rotor with more impactor pins. Additional pins can be provided by rotors having 2 or more rows of impactor pins or adding stationary pins on the housing to provide an intermeshing rotor having both stationary and rapidly moving impactor pins.

After the wetted and size reduced stucco leaves the impact mill, the material is allowed an approximately 1–10 minutes, and preferably 3–4 minutes, healing time prior to usage in formation of gypsum board or industrial bagged goods and the like. If the material is to be stored for any appreciable period of time, or to overcome the eventuality of machine breakdown in the continuous production of gypsum board, the dry-appearing but moist calcined gypsum containing from about 1 to 10% of free water and a surface area increase from prior to treatment of 50–100% is dried by any convenient means before passage to a bin for storage or further processing equipment in the production of gypsum board or other calcined gypsum products.

EXAMPLE 1

In a first series of evaluations performed on laboratory scale equipment, aliquots of calcined gypsum were fed into a standard Alpine ULTRAPLEX cross-flow centrifugal impacting laboratory mill equipped with the standard Alpine vibratory dry solids feeder. This mill was equipped with an 11½ inches in diameter rotor having 26 fins of 2 5/16 inches by 4 5/16 inches dimensions to form a "fan beater" rotor. The mill was modified to have an ⅛th inch copper tubing pass through the feed spout of the grinding chamber terminating in a Spray Systems TEE JET 11008 brand nozzle aimed at the center of the diameter of the fan beater and 2 inches from the beater. The other end of the water pipe was connected to a flow meter, flow regulator and a source of cold tap water.

In a first evaluation, 10,000 gram charge of calcined gypsum feed having a surface area of 4,500 square centimeters per gram was fed to the mill via the vibrating bin over a period of 24 seconds without any water being fed through the water line. The fan beater was operated at a speed of 4545 rpm. The exiting stucco had been ground to a surface area of about 9,400 square centimeters per gram, which was the approximate expected 2 times or 100% increase in surface area based upon previous experience in feeding dry stucco through this unit with the rotor operating at various different speeds. Then a sample of the same stucco feed which had been separately water treated to blend in 3% of free moisture was fed in the same amount and rate through the unit. The exiting stucco, on analysis, had been ground to a surface area of about 9,400 square centimeters per gram; had a 7 second dispersed consistency of about 70 and 27% reduction in water demand. Maintaining the same motor speed and rate of feeding calcined gypsum, another 10,000 gram charge of the same stucco feed was fed through the mill while water was metered at the rate of 1,400 cubic centimeters per minute. The exiting stucco, on analysis, had absorbed 2.4% of free water, had a 33% reduction in water demand; but had a surface area of 5,420 square centimeters per gram thus showing only a 20% increase in surface area in this attempt at simultaneous water treatment-grinding. Due to the lessened particle size reduction over what was expected, this sample was not evaluated further for possible utilization in the manufacture of gypsum board.

On a second evaluation, the water feed rate was adjusted to 1,105 cc. per minute, the mill speed was increased to 6,780 rpm, and a 10,000 gram charge of dry stucco having a surface area of 3,934 square centimeters per gram was fed through the unit over a period of 31 seconds. The material leaving the mill, on analysis, had a surface area of 6,500 square centimeters per gram for a 65% increase in surface area, contained about 2.3% of free water, and had a 7 second dispersed consistency of 72 and a 26% reduction in water demand. This sample was further evaluated in a comparative example on a standardized miniature gypsum boardline batch operation to evaluate proper full production size board mixing dispersion. For the comparative evaluation standard continuously produced calcined gypsum was run as a control and compared to the same material which had been rapidly water treated to obtain 3% free moisture, dried and then separately ground to 9,400 square centimeters per gram and the material obtained in this evaluation on simultaneous water treatment to contain 2.3% free water and ground to 6,500 square centimeters per gram. The results of three runs for this evaluation are set forth in Table 1 with the results for the separately and the simultaneously water treated and ground materials being the average of duplicate samples.

TABLE I

| | Untreated Control | Sequential water blend/ heal/grind | 1 | 2 | 3 |
|---|---|---|---|---|---|
| Treatment | | | | | |
| Original Surface area, cm2/gm | 3600 | 3593 | 3593 | 4500 | 3934 |
| Treated surface area, cm2/gm | | 8884 | 6400 | 5420 | 4861 |
| Stucco flow, grams/minute | | | 24000 | 22900 | 19400 |
| Water flow, grams/minute | | | 720 | 800 | 1105 |
| % Free Water | | | | | |

TABLE I-continued

| | Untreated Control | Sequential water blend/ heal/grind | 1 | 2 | 3 |
|---|---|---|---|---|---|
| Added | | 3 | 3 | 3.5 | 5.7 |
| % Free Water on Sample | | 2.2 | 2.5 | 3.0 | 3.1 |
| Properties | | | | | |
| Dispersed Consistency, cc: | | | | | |
| 7 second | 132 | 73 | 72 | 65 | 65 |
| 60 second | 182 | 90 | 94 | | |
| % Reduced Water Demand | | 18 | 20 | 22 | 26 |
| Set Suddenness, °F./minute | 9.4 | 7.8 | 7.6 | — | 7.0 |

EXAMPLE 2

For a full sized plant simulated evaluation, a standard Entoleter centrifugal impact mill as shown in the drawing, having a 27 inch diameter rotor containing 12 pins, or spindles, in a single row around the circumference of the rotor, was modified to place a quarter-inch standard pipe through the top of the grinding chamber housing midway between the feed inlets (26) as shown in FIG. 2. The pipe terminated with a 90° elbow and pipe nipple as nozzle (36) just at the inner circumference of the rotor cover top plate (32) and was directed on a radius towards the outer circumference of the rotor and the impacting target area of housing (34). The quarter inch pipe was connected to a flow meter (17), water flow regulator (18) and a source of cold tap water. Calcined gypsum feed material was metered into the hopper (14) and feed chutes (15) via a screw conveyor equipped with a variable speed control.

On a continuous half hour run the impact mill was operated at a rotor speed of 4,650 rpm while metering dry calcined gypsum having a surface area of 3,400 square centimeters per gram at a rate of 12.5 tons per hour; and metering water through the nipple at a flow rate of 1,350 lbs. per hour. Theoretically this water rate should have introduced 5.4% of water by weight into the dry stucco; however, part of the water introduced into the grinding chamber at this high speed of impinging upon the spindles apparently becomes vaporized and becomes part of the discharge air which is now heavily moisture laden and does not interact with the calcined gypsum. Thus, for this particular sample run on analysis, the material exiting the Entoleter mill contained 3.2% of free water and had a surface area of 9,735 square centimeters per gram (2.86 times surface area increase). This increase in surface area was much greater than expected from the evaluations set forth in Example 1 with the Alpine centrifugal impact mill and from prior dry grinding with the Entoleter centrifugal impact mill. Evaluations of properties for material at 3 different levels of free water are set forth in Table 2. It is noted that run Nos. 2 and 3 added water at the same rate yet in run No. 3 more of the water was retained on the sample. Apparently during the runs the system was becoming stablized with regard to moisture saturation in the air within the system allowing for a more efficient water usage. Run Nos. 2 and 3 although not fully recapturing original strength, provided a material with fully satisfactory properties for gypsum board production.

TABLE 2

| | Untreated Control | 1 | 2 | 3 |
|---|---|---|---|---|
| Treatment | | | | |
| Original surface area, cm$^2$/gm | 3400 | 3400 | 3400 | 3400 |
| Treated surface area, cm$^2$/gm | | 8970 | 9735 | 9735 |
| Stucco flow tons/hour | | 12.5 | 12.5 | 12.5 |
| Water flow, tons/hour | | .34 | .47 | .47 |
| % Free Water Added | | 2.7 | 3.8 | 3.8 |
| % Free Water on Sample | | 1.8 | 2.76 | 3.2 |
| Properties | | | | |
| % Increased Surface area | | 164 | 186 | 186 |
| Dispersed Consistency, cc: | | | | |
| 7 second | 142 | — | 67 | 67 |
| 60 second | 192 | 89 | 85 | 83 |
| % Reduced Water Demand | | | 22 | 22 |
| Machine Mixing: | | | | |
| Stiffening, minutes | 6 | — | 7 | 5¼ |
| Set, minutes | 13 | — | 15¼ | 14 |
| Set Suddenness, °F./minutes | 8.1 | — | — | 7.7 |
| Slurry Cube Strength: | | | | |
| actual p.s.i. | 882 | — | 1760 | 1675 |
| at 42 p.c.f. density | 793 | — | 635 | 594 |
| % of normal | 155 | — | 124 | 116 |

For the above described treatment the calcined gypsum feed material may be any product of conventional batch or continuous calcination from any gypsum source, such as natural rock or that derived from chemical processes or blends of natural rock gypsum and chemical process gypsum. The treated material may be combined with conventional additives such as accelerators, retarders, fluidizing agents, mixtures thereof and the like in customary amounts for use in making gypsum wallboard or industrial plasters. For gypsum board manufacture the treated material will be passed ordinarily directly to the slurry board mixer. The treated material may optionally be dried as for storage stability in the manufacture of bagged industrial plaster goods.

Having completely described this invention, what is claimed is:

1. An improved process for manufacturing gypsum board characterized by using a reduced amount of water to fluidize calcined gypsum in forming a gypsum slurry which is fed to a boardmaking machine while maintaining the compressive strength of the dried gypsum board which comprises:
   (1) Supplying calcined gypsum feed to be conveyed to a gypsum slurry mixer;
   (2) conveying the calcined gypsum feed to an impacting blender;
   (3) blending a small amount of water with said calcined gypsum and simultaneously or substantially simultaneously grinding the calcined gypsum to increase the surface area of the gypsum particles, said water ranging from about 1% to 10% by weight of the calcined gypsum feed, said grinding increasing the surface area of the gypsum particles up to about 4 times;
   (4) allowing the freshly exposed facets of the treated calcined gypsum particles to heal;
   (5) conveying the healed calcined gypsum to a gypsum slurry mixer;
   (6) adding additional water to the healed calcined gypsum in the slurry mixer, said additional water being added in an amount sufficient to provide from about 50 to 85 parts of water, including water added in the blender, per 100 parts of the calcined gypsum, which results in a substantially reduced amount of water to be evaporated from the wet boards;
   (7) mixing the healed calcined gypsum and water in the slurry mixer to form a homogeneous slurry;
   (8) feeding the slurry to a gypsum board making machine to form a wet gypsum board;
   (9) passing the wet gypsum board through a kiln to dry the board;
   (10) recovering dry gypsum board consisting essentially of calcium sulphate dihydrate.

2. The process of claim 1 in which about 2½ to about 3½% of free water is obtained on the treated calcined gypsum particles.

3. The process of claim 1 in which the treated material is allowed to heat for about 2–10 minutes.

4. The process of claim 1 in which the treated material is allowed to heal for about 2 minutes.

5. The process of claim 1 in which the surface area of the treated particles is increased about 150–200%.

6. An improved process for preparing calcined gypsum characterized by providing the calcined gypsum with a reduced water demand while maintaining its ability to develop the necessary compressive strength for a cast gypsum product which comprises;
   (1) supplying calcined gypsum feed to be conveyed to an impacting blender;
   (2) conveying the calcined gypsum feed into the blender;
   (3) blending a small amount of water with said calcined gypsum simultaneously or substantially simultaneously in the blender while grinding the calcined gypsum to increase the surface area of the calcined gypsum particles, said water ranging from about 1% to about 10% by weight of the calcined gypsum feed and said grinding increasing the surface area up to about 4 times the surface area of the untreated calcined gypsum feed;
   (4) allowing the freshly exposed facets of the treated and ground calcined gypsum particles to heal;
   (5) drying the healed calcined gypsum by subjecting it to elevated temperatures;
   (6) recovering a dried, healed calcined gypsum which is storage stable, has reduced water demand and is capable of developing substantially full compressive strength in a cast gypsum product.

* * * * *